(12) United States Patent
Iijima

(10) Patent No.: US 9,400,106 B2
(45) Date of Patent: Jul. 26, 2016

(54) $CO_2$ RECOVERY SYSTEM AND RECOVERY METHOD FOR MOISTURE CONTAINING $CO_2$ GAS

(71) Applicant: MITSUBISHI HEAVY INDUSTRIES, LTD., Tokyo (JP)

(72) Inventor: Masaki Iijima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/703,497

(22) Filed: May 4, 2015

(65) Prior Publication Data

US 2015/0233577 A1 Aug. 20, 2015

Related U.S. Application Data

(62) Division of application No. 13/417,441, filed on Mar. 12, 2012, now Pat. No. 9,050,555.

(30) Foreign Application Priority Data

Apr. 14, 2011 (JP) .................................. 2011-090506

(51) Int. Cl.
*B01D 53/14* (2006.01)
*F23J 15/02* (2006.01)

(52) U.S. Cl.
CPC ............. *F23J 15/02* (2013.01); *B01D 53/1418* (2013.01); *B01D 53/1425* (2013.01); *B01D 53/1475* (2013.01)

(58) Field of Classification Search
CPC combination set(s) only.
See application file for complete search history.

(56) References Cited

U.S. PATENT DOCUMENTS

| 3,932,582 A | 1/1976 | Eickmeyer |
| 8,052,948 B2 | 11/2011 | Iijima |

(Continued)

FOREIGN PATENT DOCUMENTS

| DE | 36 27 777 A1 | 2/1988 |
| EP | 2 105 189 A1 | 9/2009 |

(Continued)

OTHER PUBLICATIONS

Extended European Search Report dated Jul. 24, 2012, issued in corresponding European Patent Application No. 12163841.5 (8 pages).

(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

A $CO_2$ recovery system 10A has a $CO_2$ recovery unit 11, a compression unit 12, and a condensed-water supply line 65A that supplies condensed water 64 to an absorbent regenerator 14. The $CO_2$ recovery unit 11 includes a $CO_2$ absorber 13 and the absorbent regenerator 14. The compression unit 12 has a first compressor 61-1 to an nth compressor 61-$n$ that compress $CO_2$ gas 56 emitted from the absorbent regenerator 14, a first separator 63-1 to an nth separator 63-$n$ that reduce moisture in the $CO_2$ gas 56, and a first heat exchanger 66-1 that performs heat exchange between the $CO_2$ gas 56 emitted from the first compressor 61-1 and the condensed water 64 emitted from the first separator 63-1.

2 Claims, 7 Drawing Sheets

(56) References Cited

U.S. PATENT DOCUMENTS

| | | | |
|---|---|---|---|
| 8,080,089 B1 | 12/2011 | Wen et al. | |
| 2010/0029466 A1 | 2/2010 | Woodhouse | |
| 2010/0083696 A1* | 4/2010 | Hoang-Dinh et al. | 62/611 |
| 2011/0308389 A1* | 12/2011 | Graff et al. | 95/166 |

FOREIGN PATENT DOCUMENTS

| | | | |
|---|---|---|---|
| EP | 2 229 996 A1 | 9/2010 | |
| FR | 2 947 185 A1 | 12/2012 | |
| JP | 07-51537 A | 2/1995 | |
| JP | 2002-126439 A | 5/2002 | |
| JP | 2008-062165 A | 3/2008 | |
| JP | 2010-235395 A | 10/2010 | |
| WO | 2007/019632 A1 | 2/2007 | |
| WO | 2007/073201 A1 | 6/2007 | |
| WO | 2008/063082 A2 | 5/2008 | |
| WO | 2010/113364 A1 | 10/2010 | |
| WO | 2010/142716 A1 | 12/2010 | |

OTHER PUBLICATIONS

Australian Notice of Acceptance dated Feb. 7, 2014, issued in corresponding Australian Patent Application No. 2012201488 (48 pages).

Office Action dated Jan. 13, 2015, issued in corresponding Japanese Patent Application No. 2011-090506, with English translation (8 pages).

Notice of Allowance dated Oct. 7, 2015, issued in counterpart Canadian Patent Application No. 2851448 (1 page).

Decision of a Patent Grant dated Dec. 22, 2015, issued in counterpart Japanese Patent Application No. 2011-090506, with English translation. (3 page).

* cited by examiner

CO₂ RECOVERY SYSTEM AND RECOVERY METHOD FOR MOISTURE CONTAINING CO₂ GAS

CROSS-REFERENCE TO RELATED APPLICATIONS

This application is a Divisional application of U.S. application Ser. No. 13/417,441 filed Mar. 12, 2012, which is based on and claims the benefit of priority from Japanese Patent Application No. 2011-090506 filed on Apr. 14, 2011, the entire contents of which being incorporated herein by reference.

FIELD

The present invention relates to a $CO_2$ recovery system and a recovery method for moisture containing $CO_2$ gas that enable to recover water containing an absorbent, which is generated when $CO_2$ gas emitted from a regenerator is compressed.

BACKGROUND

In thermal power plants using a large amount of fossil fuel and the like, flue gas generated by burning the fossil fuel in a boiler contains $CO_2$. Methods that enable to reduce and recover $CO_2$ in the flue gas by bringing the flue gas containing $CO_2$ into gas-liquid contact with an amine $CO_2$ absorbent in a $CO_2$ absorber and causing the $CO_2$ absorbent to absorb the $CO_2$, and methods that enable to store recovered $CO_2$ without releasing the $CO_2$ to the atmosphere have been intensively studied.

For example, a method by which a $CO_2$ absorbent absorbs $CO_2$ in flue gas in a $CO_2$ absorber to reduce $CO_2$ from the flue gas, then the $CO_2$ absorbed by the $CO_2$ absorbent is liberated in a regenerator to regenerate the $CO_2$ absorbent, and the regenerated $CO_2$ absorbent is circulated again to the $CO_2$ absorber to be reused to reduce $CO_2$ from the flue gas is employed (see Patent Literature 1, for example). In this method, the $CO_2$ absorbent having absorbed $CO_2$ is heated with vapor in the regenerator, thereby liberating the $CO_2$, and accordingly high-purity $CO_2$ is recovered.

$CO_2$ gas accompanied by water vapor, which is released from a rich solution and a semi-lean solution in the regenerator, is emitted from the top of the regenerator, then the water vapor in the $CO_2$ gas is condensed by a condenser, and water generated in the $CO_2$ gas is separated by a separation drum. The $CO_2$ gas from which the water vapor has been separated is compressed by a plurality of compressors with the pressure gradually increased, thereby being recovered as compressed $CO_2$. After being compressed by the compressors, the $CO_2$ gas is pressed into an oilfield to be used for enhanced oil recovery (EOR), accumulated in an aquifer as a measure against global warming, or used as a synthetic raw material of chemical products.

When the $CO_2$ gas is compressed, cooled, and pressed into the oilfield to be used for oil recovery or the like, moisture remaining in the $CO_2$ gas is condensed by the compression to become condensed water, and then COD components are resolved or the like, are subjected to effluent treatment, and then are discharged to outside.

CITATION LIST

Patent Literature

Patent Literature 1: Japanese Patent Application Laid-open No. 2008-62165

SUMMARY

Technical Problem

Because the recovered $CO_2$ contains a small quantity of the absorbent, the condensed water produced by compressing the $CO_2$ gas contains the absorbent. Accordingly, methods that enable to efficiently use the condensed water to be discharged to outside are studied to reduce a consumption amount of the absorbent circulating in a system between the $CO_2$ absorber and the absorbent regenerator and to efficiently use the absorbent.

Meanwhile, using heat emission from a $CO_2$ compressor system to recover heat and efficiently using the heat in a $CO_2$ recovery system is demanded.

The present invention has been achieved in view of the above problems, and objects of the present invention are to provide a $CO_2$ recovery system that enables to recover condensed water contained in $CO_2$ gas without discharging the condensed water to outside to efficiently use an absorbent contained in the condensed water, and to efficiently use heat emission from a $CO_2$ compressor system.

Solution to Problem

According to an aspect of the present invention, a $CO_2$ recovery system includes: a $CO_2$ recovery unit comprising a $CO_2$ absorber that absorbs and reduces $CO_2$ in flue gas containing $CO_2$ using a $CO_2$ absorbent by bringing the flue gas into contact with the $CO_2$ absorbent, and an absorbent regenerator that regenerates a $CO_2$ absorbent having absorbed $CO_2$ in the $CO_2$ absorber to obtain a $CO_2$ absorbent; a $CO_2$ compression unit comprising at least one or more compressors that compress $CO_2$ gas emitted from the absorbent regenerator, and separators that are located between any two of the compressors to separate moisture contained in the $CO_2$ gas as condensed water from the $CO_2$ gas by cooling compressed $CO_2$ gas; and a condensed-water supply line that supplies the condensed water separated from the $CO_2$ gas through any one of the separators into a system in which the $CO_2$ absorbent circulates between the $CO_2$ absorber and the absorbent regenerator.

Advantageously, in the $CO_2$ recovery system, the condensed water separated from the separator is supplied to inside of the $CO_2$ absorber, to the $CO_2$ absorbent circulating between the $CO_2$ absorber and the absorbent regenerator, to return water to be supplied to the absorbent regenerator from a separation drum that separates water from the $CO_2$ gas emitted from the absorbent regenerator, and to a top circulating-water line of the absorber.

Advantageously, in the $CO_2$ recovery system, at least one heat exchanger that performs heat exchange between $CO_2$ gas emitted from any one of the compressors and condensed water emitted from any one of the separators is provided between the compressor and the separator, the heat exchanger is located on the condensed-water supply line to cause the condensed water to become vapor, and the condensed-water supply line is connected to a bottom of the absorbent regenerator.

According to another aspect of the present invention, a recovery method for moisture containing $CO_2$ gas that enables to absorb and reduce $CO_2$ in flue gas containing $CO_2$ using a $CO_2$ absorbent by bringing the flue gas into contact with the $CO_2$ absorbent in a $CO_2$ absorber, then reduce $CO_2$ in the $CO_2$ absorbent having absorbed $CO_2$ in an absorbent regenerator, and reuse a regenerated $CO_2$ absorbent in the $CO_2$ absorber while recovering $CO_2$ gas emitted from the absorbent regenerator and recovering moisture in the recovered $CO_2$ gas, the recovery method comprising: compressing the $CO_2$ gas recovered from the absorbent regenerator using at least one or more compressors; separating moisture in the $CO_2$ gas as condensed water from the $CO_2$ gas using a compressed $CO_2$ gas cooler provided between any two of compressors and separators; and supplying the condensed water separated from the $CO_2$ gas through any one of the separators into a system in which the $CO_2$ absorbent circulates between the $CO_2$ absorber and the absorbent regenerator through a condensed-water supply line.

Advantageously, in the recovery method for moisture containing $CO_2$ gas, condensed water emitted from the separator and subjected to heat exchange is supplied to inside of the $CO_2$ absorber, to the $CO_2$ absorbent circulating between the $CO_2$ absorber and the absorbent regenerator, to return water to be supplied to the absorbent regenerator from a separation drum that separates water from the $CO_2$ gas emitted from the absorbent regenerator, and to a top circulating-water line of the absorber.

Advantageously, in the recovery method for moisture containing $CO_2$ gas, at least one heat exchanger that performs heat exchange between $CO_2$ gas emitted from any one of the compressors and condensed water emitted from any one of the separators is provided, and the condensed water emitted from any one of the separators is subjected to heat exchange in the heat exchanger with the $CO_2$ gas emitted from any one of compressors through the condensed-water supply line to generate vapor and is supplied to a bottom of the absorbent regenerator.

Furthermore, configurations described below can be also adopted to solve the above problems.

That is, the seventh invention is preferably the $CO_2$ recovery system in the third invention in which a first heat exchanger that performs heat exchange between $CO_2$ gas emitted from a first compressor located on a most preflow side among the compressors and condensed water separated from the $CO_2$ gas by a first separator located on a most preflow side among the separators is provided, a first condensed-water supply line connects the first separator and the bottom of the absorbent regenerator, and the condensed water separated from the $CO_2$ gas by the first separator is caused to become vapor by the heat exchange in the first heat exchanger with the $CO_2$ gas emitted from the first compressor and then is supplied to the bottom of the absorbent regenerator.

The eighth invention is preferably the $CO_2$ recovery system in the third or seventh invention in which a second heat exchanger that performs heat exchange between $CO_2$ gas emitted from a second compressor located second from the preflow side among the compressors and condensed water separated from the $CO_2$ gas by a second separator located second from the preflow side among the separators is provided, a second condensed-water supply line connects the second separator and the bottom of the absorbent regenerator, and the condensed water separated from the $CO_2$ gas by the second separator is caused to become vapor by the heat exchange in the second heat exchanger with the $CO_2$ gas emitted from the second compressor and then is supplied to the bottom of the absorbent regenerator.

The ninth invention is preferably the $CO_2$ recovery system in the eighth invention in which when the first condensed-water supply line is provided, the first condensed-water supply line is connected to the second condensed-water supply line before or after the second heat exchanger.

The tenth invention is preferably the recovery method for moisture containing $CO_2$ gas in the sixth invention in which condensed water separated from the $CO_2$ gas by a first separator located on a most preflow side among the separators is subjected to heat exchange in a first exchanger with $CO_2$ gas emitted from a first compressor located on a most preflow side among the compressors through a first condensed-water supply line and then is supplied to the bottom of the absorbent regenerator.

The eleventh invention is the recovery method for moisture containing $CO_2$ gas in the sixth or tenth invention in which condensed water separated from the $CO_2$ gas by a second separator located second from the preflow side among the separators is subjected to heat exchange in a second heat exchanger with $CO_2$ gas emitted from a second compressor located second from the preflow side among the compressors through a second condensed-water supply line and then is supplied to the bottom of the absorbent regenerator.

The twelfth invention is the recovery method for moisture containing $CO_2$ gas in the eleventh invention in which when the first condensed-water supply line is provided, the first condensed-water supply line is connected to the second condensed-water supply line before or after the second heat exchanger.

Advantageous Effects of Invention

According to the present invention, condensed water contained in $CO_2$ gas can be recovered without discharging the condensed water to outside to efficiently use an absorbent contained in the condensed water.

DESCRIPTION OF EMBODIMENTS

The present invention will be explained below in detail with reference to the accompanying drawings. The present invention is not limited to the following modes for carrying out the invention (hereinafter, "embodiments"). In addition, constituent elements in the following embodiments include those that can be easily assumed by persons skilled in the art, or that are substantially equivalent and so-called equivalents. Furthermore, constituent elements disclosed in the following embodiments can be appropriately combined with each other.

First Embodiment

Figure 1:
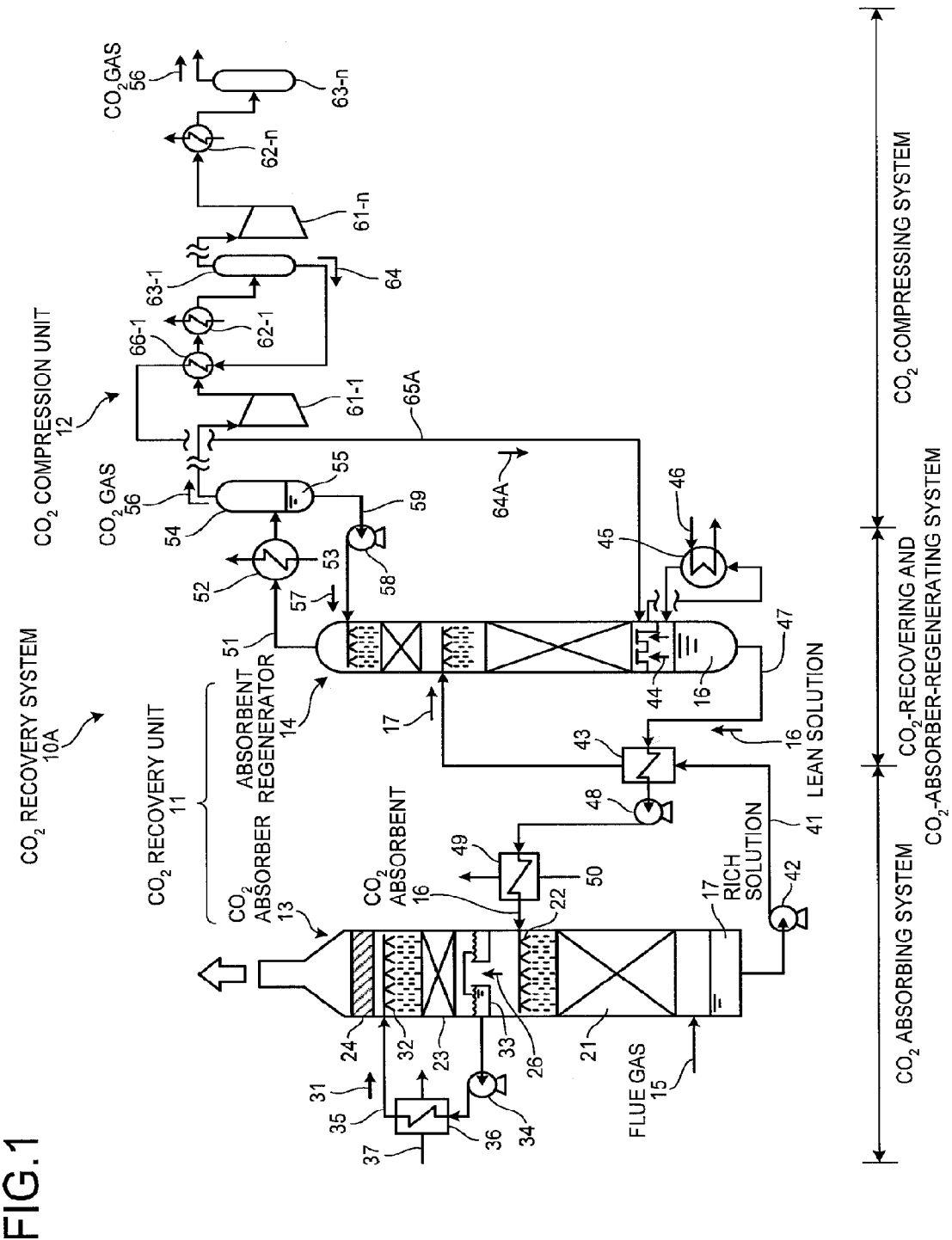
FIG. 1 is a schematic diagram of a configuration of a $CO_2$ recovery system according to a first embodiment of the present invention.

A $CO_2$ recovery system according to a first embodiment of the present invention is explained with reference to the drawings. FIG. 1 is a schematic diagram of a configuration of a $CO_2$ recovery system according to the first embodiment of the present invention. As shown in FIG. 1, a $CO_2$ recovery system 10A includes a $CO_2$ recovery unit 11 and a compression unit 12. The $CO_2$ recovery unit 11 has a $CO_2$ absorber 13 and an absorbent regenerator (hereinafter, "regenerator") 14.

The $CO_2$ recovery system 10A includes a $CO_2$ absorbing system that absorbs $CO_2$ by the $CO_2$ absorber 13, a $CO_2$-recovering and $CO_2$-absorber-regenerating system that performs $CO_2$ recovery and $CO_2$ absorber regeneration by the regenerator 14, and a $CO_2$ compressing system that compresses $CO_2$ recovered by the compression unit 12 to be injected in the ground or in an oilfield.

In the $CO_2$ recovery unit 10A, a $CO_2$ absorbent 16 that absorbs $CO_2$ in flue gas 15 containing $CO_2$ circulates between the $CO_2$ absorber 13 and the regenerator 14 (hereinafter, "within the system"). A $CO_2$ absorbent (rich solution) 17 having absorbed $CO_2$ in the flue gas 15 is supplied from the $CO_2$ absorber 13 to the regenerator 14. The $CO_2$ absorbent (lean solution) 16 that is regenerated by reducing almost all $CO_2$ from the rich solution 17 in the regenerator 14 is supplied from the regenerator 14 to the $CO_2$ absorber 13.

The flue gas 15 contains $CO_2$ emitted from industrial facilities such as a boiler and a gas turbine. The flue gas 15 is subjected to pressure rising by a flue gas blower or the like, is cooled by a cooler, and then is sent through a side wall of the bottom of the $CO_2$ absorber 13 to inside of the $CO_2$ absorber 13 via a flue.

The $CO_2$ absorber 13 brings the flue gas 15 into contact with the $CO_2$ absorbent 16 to reduce $CO_2$ from the flue gas 15. The $CO_2$ absorber 13 has a $CO_2$ absorbing unit 21, a spray nozzle 22, a water-washing unit 23, and a demister 24. The flue gas 15 supplied into the absorber flows from a bottom side in the absorber to a top side. The spray nozzle 22 sprays the $CO_2$ absorbent 16 to a downward direction. The $CO_2$ absorbing unit 21 is provided on a preflow side in a flow direction of the flue gas 15 in the $CO_2$ absorber 13. In the present embodiment, the $CO_2$ absorbing unit 21 is provided on a lower side of the $CO_2$ absorber 13.

In the $CO_2$ absorbing unit 21, the flue gas 15 moving upward in the absorber comes into contact with an opposed flow of the $CO_2$ absorbent 16 having a basic amine compound as a base, for example, and $CO_2$ in the flue gas 15 is absorbed by the $CO_2$ absorbent 16.

Although not particularly limited thereto, alkanolamine or hindered amines having an alcoholic hydroxyl group can be cited as examples of the $CO_2$ absorbent that can be used in the present embodiment. As the alkanolamine, monoethanolamine, diethanolamine, triethanolamine, methyldiethanolamine, diisopropanolamine, diglycolamine, and the like can be cited as examples and, usually, monoethanolamine (MEA) is preferably used. As the hindered amines having an alcoholic hydroxyl group, 2-amino-2-methyl-1-propanol (AMP), 2-(ethylamino)-ethanol (EAE), 2-(methylamino)-ethanol (MAE), and the like can be cited as examples.

The lean solution 16 is sprayed through the spray nozzle 22 to absorb $CO_2$ in the flue gas 15 in the $CO_2$ absorbing unit 21, resulting in the rich solution 17. The rich solution 17 passes through the $CO_2$ absorbing unit 21 and then is stored at the absorber bottom.

While the $CO_2$ absorber 13 has one $CO_2$ recovering unit 21 in the present embodiment, the present embodiment is not limited thereto and a plurality of $CO_2$ recovering units 21 can be provided.

The water-washing unit 23 and the demister 24 are provided on a postflow side in the flow direction of the flue gas 15 in the $CO_2$ absorber 13. In the present embodiment, the water-washing unit 23 and the demister 24 are provided above the $CO_2$ absorbing unit 21 in the absorber. $CO_2$-reduced flue gas 26 having $CO_2$ reduced therefrom by the $CO_2$ absorbing unit 21 is discharged from the system through the absorber top after the $CO_2$ absorbent 16 accompanied by the $CO_2$-reduced flue gas 26 is reduced by the water-washing unit 23 and mist contained in the $CO_2$-reduced flue gas 26 is collected by the demister 24. While the $CO_2$ absorber 13 has one water-washing unit 23 in the present embodiment, a plurality of water-washing units 23 can be provided.

Water 31 supplied from outside to the water-washing unit 23 is sprayed through a spray nozzle 32 to reduce impurities contained in the $CO_2$-reduced flue gas 26 in the water-washing unit 23. The water having sprayed through the spray nozzle 32 is recovered by a receiving unit 33, sent to outside of the absorber by a pump 34, cooled by cooling water 37 in a cooler 36 through a top circulating-water line 35, and then supplied to the spray nozzle 32 to be cyclically used.

The rich solution 17 having absorbed $CO_2$ in the flue gas 15 in the $CO_2$ absorbing unit 21 is stored at the bottom of the $CO_2$ absorber 13. The rich solution 17 stored at the bottom of the $CO_2$ absorber 13 is extracted through a rich-solution supply line 41, pumped from the bottom of the $CO_2$ absorber 13 by a pump 42 that is provided outside, subjected to heat exchange by a rich/lean solution heat exchanger 43 with the $CO_2$ absorbent 16 regenerated by the regenerator 14, and then supplied into the regenerator 14 from the regenerator top.

Types of the heat exchanger to be used in the present embodiment, such as the rich/lean solution heat exchanger 43, are not particularly limited, and a known heat exchanger such as a plate heat exchanger or a shell-and-tube heat exchanger can be used.

The regenerator 14 releases $CO_2$ from the rich solution 17 to regenerate the lean solution 16. The rich solution 17 released from the top of the regenerator 14 to inside of the regenerator 14 is heated with vapor (steam) 44 supplied from the bottom of the regenerator 14. The steam 44 is generated by performing heat exchange between the lean solution 16 and saturated steam 46 in a regenerating superheater (reboiler) 45. The rich solution 17 is subjected to endothermic by being heated with the steam 44, releases most parts of $CO_2$ contained in the rich solution 17, and becomes the $CO_2$ absorbent (lean solution) 16 having almost all $CO_2$ reduced therefrom by the time the rich solution 17 reaches the bottom of the regenerator 14.

The lean solution 16 stored at the bottom of the regenerator 14 is extracted as a $CO_2$ absorbent from the bottom of the regenerator 14 through a lean-solution supply line 47, sent by a pump 48, cooled through heat exchange with cooling water 50 in a cooler 49, and then supplied to the $CO_2$ absorber 13.

Meanwhile, $CO_2$ gas 51 accompanied by water vapor is emitted from the top of the regenerator 14. The $CO_2$ gas 51 accompanied by water vapor is led out from the top of the regenerator 14, then the water vapor contained in the $CO_2$ gas 51 is condensed by a condenser 52 with cooling water 53, and water 55 is separated by a separation drum 54. $CO_2$ gas 56 separated from the water 55 by the separation drum 54 is sent to the compression unit 12. The water 55 separated by the separation drum 54 is supplied as return water 57 to an upper portion of the regenerator 14 by a condensed-water circulating pump 58 through a return-water supply line 59.

The compression unit 12 includes a first compressor 61-1 to an nth compressor 61-$n$ (n is an integer equal to or larger than 2) that compress the $CO_2$ gas 56 emitted from the regenerator 14, a first cooler 62-1 to an nth cooler 62-$n$ (n is an integer equal to or larger than 2) that cool the compressed $CO_2$ gas 56, and a first separator 63-1 to an nth separator 63-$n$ (n is an integer equal to or larger than 2) that reduce moisture in the $CO_2$ gas 56.

The first compressor 61-1 is located on a most preflow side among the compressors, the first cooler 62-1 is located on a most preflow side among the coolers, and the first separator 63-1 is located on a most preflow side among the separators.

For the $CO_2$ gas 56, a step of gradually compressing the $CO_2$ gas 56 by the first compressor 61-1 to the nth compressor 61-$n$ in this order, cooling the $CO_2$ gas 56 by the first cooler 62-1 to the nth cooler 62-$n$, and separating condensed water 64 generated by cohesion by the first separator 63-1 to the nth separator 63-$n$ is repeated in the compression unit 12.

Specifically, the $CO_2$ gas 56 is compressed by the first compressor 61-1 and then cooled by the first cooler 62-1, thereby cohering moisture in the $CO_2$ gas 56. The condensed water 64 generated in the $CO_2$ gas 56 by cohesion is separated by the first separator 63-1. The $CO_2$ gas 56 from which the condensed water 64 generated by cohesion has been separated is emitted from the top of the first separator 63-1 and supplied to a compressor located on a postflow side of the first separator 63-1. The $CO_2$ gas 56 is repeatedly subjected to the same operation up to the nth compressor 61-$n$, and then an operation of separating from the $CO_2$ gas 56 the condensed water 64 generated by cooling the $CO_2$ gas 56 after the $CO_2$ gas 56 is compressed by gradually increasing the pressure is repeated. While the compression unit 12 has the n compressors, it is preferable to provide one to four compressors.

The $CO_2$ recovery system 10A has a first condensed-water supply line 65A that connects the bottom of the first separator 63-1 and the bottom of the absorbent regenerator 14. The first condensed-water supply line 65A supplies the condensed water 64 separated from the $CO_2$ gas 56 by the first separator 63-1 to the bottom of the absorbent regenerator 14 from the first separator 63-1. This enables the absorbent contained in the condensed water 64 separated by the first separator 63-1 to be supplied accompanied by the condensed water 64 to the bottom of the regenerator 14, and accordingly the absorbent contained in the condensed water 64 can be recovered without being discharged to outside. For example, when a content of the absorbent contained in the $CO_2$ gas 56 is about 1 ppm, a content of the absorbent contained in the condensed water 64 is about 75 ppm mass %.

In this way, the moisture contained in the $CO_2$ gas 56 recovered from the regenerator 14 can be recovered as the condensed water 64 by the first separator 63-1 and supplied to the bottom of the absorbent regenerator 14 through the first condensed-water supply line 65A and thus the absorbent remaining in the condensed water 64 can be recovered. Accordingly, the absorbent can be recovered and efficiently used without being discharged to outside.

The compression unit 12 also has a first heat exchanger 66 between the first compressor 61-1 and the first separator 63-1. The first heat exchanger 66 performs heat exchange between the $CO_2$ gas 56 emitted from the first compressor 61-1 and the condensed water 64 separated from the $CO_2$ gas 56 by the first separator 63-1. The condensed water 64 emitted from the first separator 63-1 is sent to the first heat exchanger 66, subjected to heat exchange by the first heat exchanger 66 with the $CO_2$ gas 56 emitted from the first compressor 61-1 to become vapor 64A, and then supplied to the bottom of the regenerator 14. Because the $CO_2$ gas 56 is compressed by the first compressor 61-1, the $CO_2$ gas 56 emitted from the first compressor 61-1 has a gas temperature higher than before the $CO_2$ gas 56 is supplied to the first compressor 61-1. Accordingly, the condensed water 64 emitted from the first separator 63-1 is subjected to the heat exchange by the first heat exchanger 66 with the $CO_2$ gas 56 emitted from the first compressor 61-1 to increase a liquid temperature of the condensed water 64 emitted from the first separator 63-1, which enables the vapor 64A to be generated. An amount of the vapor 44 to be generated by the reboiler 45 can be reduced by supplying the condensed water 64 subjected to the heat exchange by the first heat exchanger 66 and having a higher temperature to the bottom of the regenerator 14.

In this way, the condensed water 64 emitted from the first separator 63-1 is previously subjected to heat exchange by the first heat exchanger 66-1 with the $CO_2$ gas 56 emitted from the first compressor 61-1 before it is supplied to the bottom of the regenerator 14 and then supplied as the vapor 64A to the bottom of the regenerator 14. Accordingly, an amount of vapor consumed by the reboiler 45 to generate the steam 44 by heating the lean solution 16 can be reduced.

For example, the $CO_2$ gas 56 supplied from the separation drum 54 to the first compressor 61-1 has a gas temperature of about 45° C. The $CO_2$ gas 56 is compressed by the first compressor 61-1 and the $CO_2$ gas 56 sent from the first compressor 61-1 to the heat exchanger 66 has a gas temperature of about 170° C., for example. The condensed water 64 emitted from the first separator 63-1 has a temperature of about 45° C., for example. By performing indirect heat exchange between the condensed water 64 and the $CO_2$ gas 56 by the heat exchanger 66, the $CO_2$ gas 56 sent to the first separator 63-1 comes to have a gas temperature of 117° C., for example, and the condensed water 64 having a temperature of about 122.6° C., for example, is supplied to the bottom of the regenerator 14 to be mixed with the lean solution 16 heated by the reboiler 45. Accordingly, it is possible to reduce an amount of vapor consumed in the reboiler 45 (about 2%, for example) to heat the lean solution 16 and generate steam by previously heating the condensed water 64 in the first heat exchanger 66 before the condensed water 64 is supplied to the bottom of the regenerator 14 and generating the vapor 64A.

Because recovery of the moisture contained in the $CO_2$ gas 56 can be handled by the $CO_2$ compressing system, there is no need to newly install a pipe or the like for separating moisture from the $CO_2$ gas 56 and supplying the condensed water 64.

Furthermore, because the condensed water 64 is obtained in a pressured state by the first compressor 61-1 and inside of the regenerator 14 is at a normal pressure, the water 65 recovered by the first separator 63-1 can be easily supplied to the regenerator 14 by use of a pressure difference, without using a supply pump or the like.

In the $CO_2$ recovery system 10A according to the present embodiment, the first heat exchanger 66 is located on a more preflow side than the first cooler 62-1. While the first heat exchanger 66-1 can be located on either before or after the first cooler 62-1, it is preferable to locate the first heat exchanger 66-1 on the more preflow side than the first cooler 62-1 to efficiently perform the heat exchange with the $CO_2$ gas 56.

While the condensed water 64 is supplied to the bottom of the regenerator 14 in the $CO_2$ recovery system 10A according to the present embodiment, the present embodiment is not limited thereto and the condensed water 64 can be supplied to an intermediate position of the regenerator.

Figure 2:
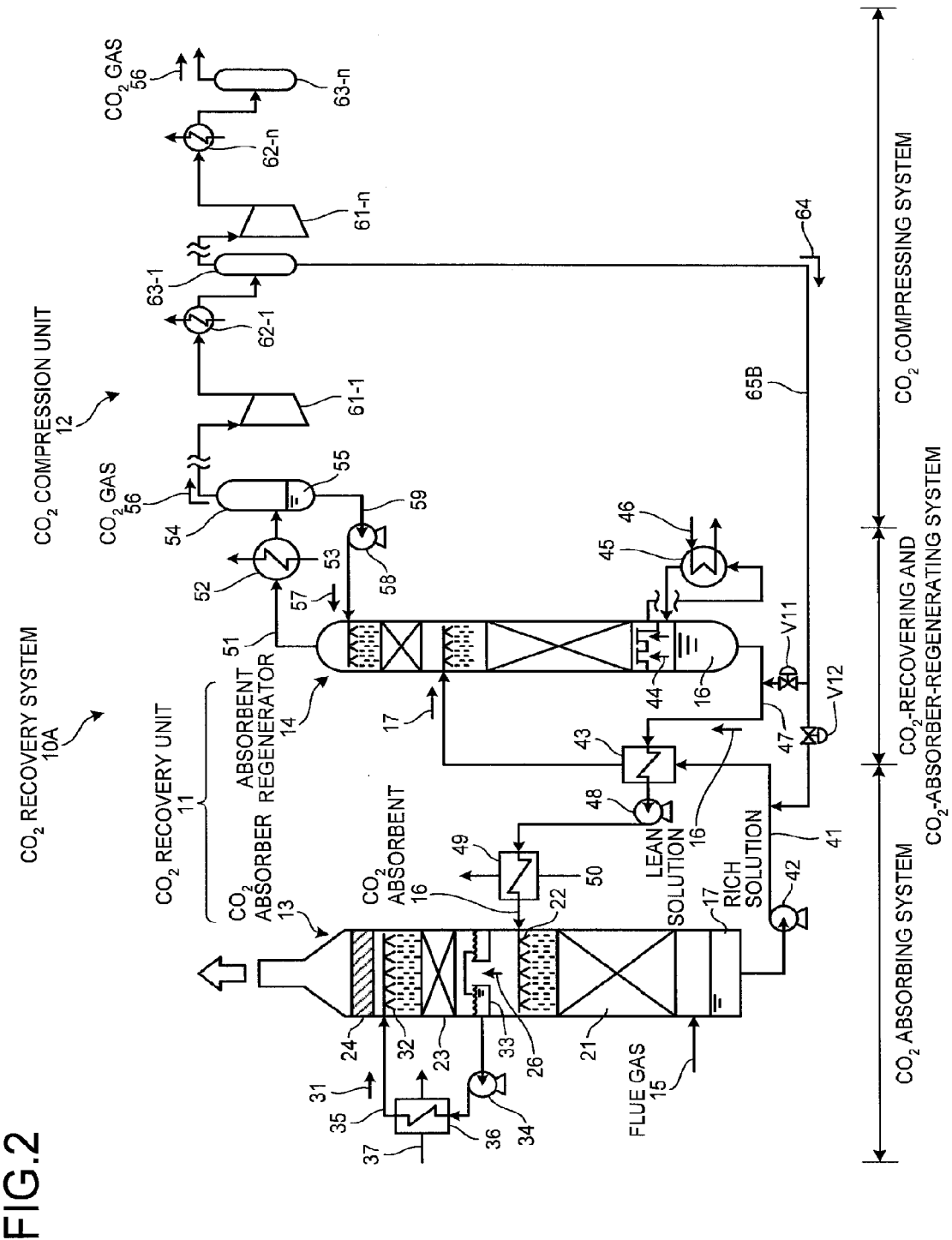
FIG. 2 is a schematic diagram of another configuration of the $CO_2$ recovery system according to the first embodiment of the present invention.
Figure 3:
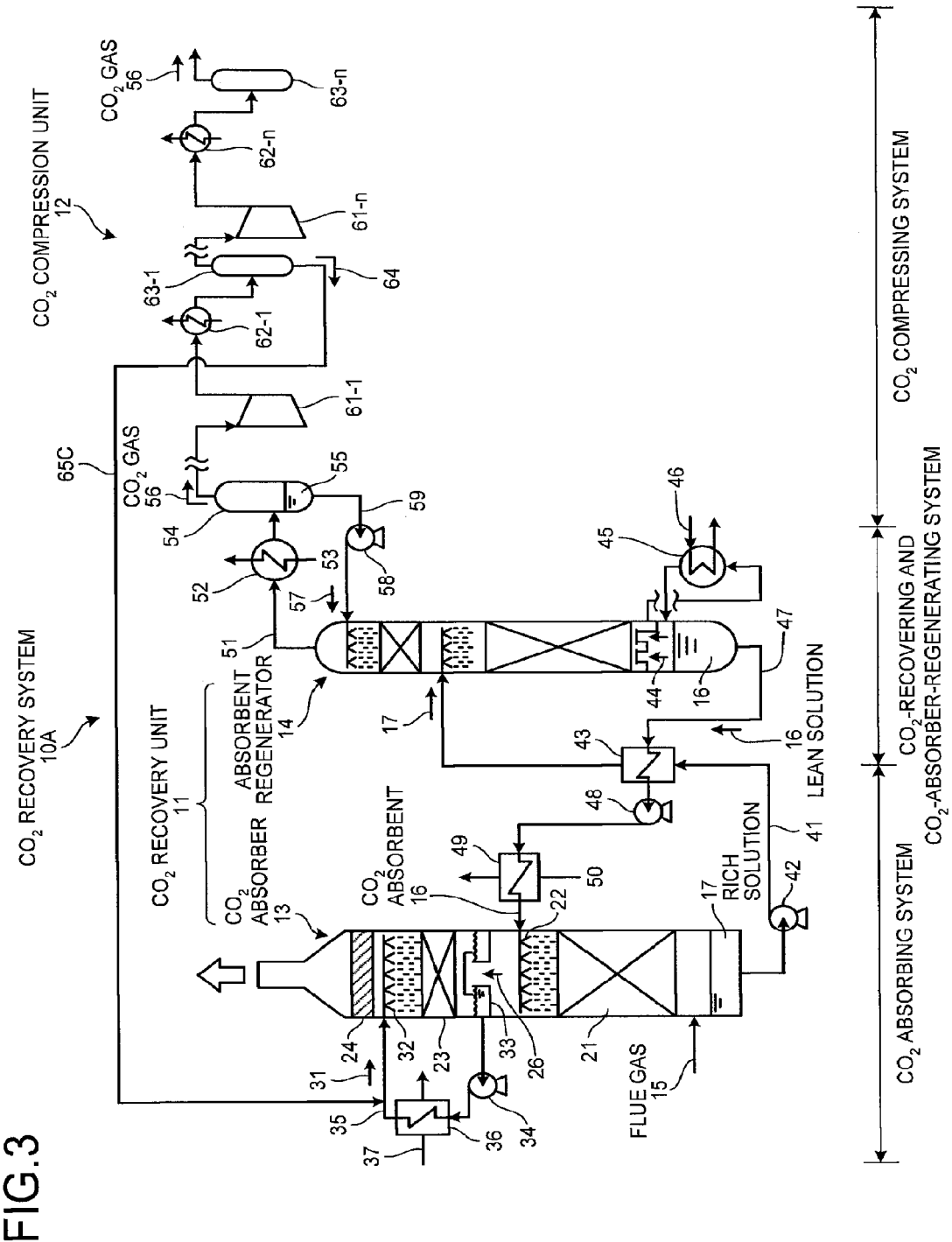
FIG. 3 is a schematic diagram of still another configuration of the $CO_2$ recovery system according to the first embodiment of the present invention.
Figure 4:
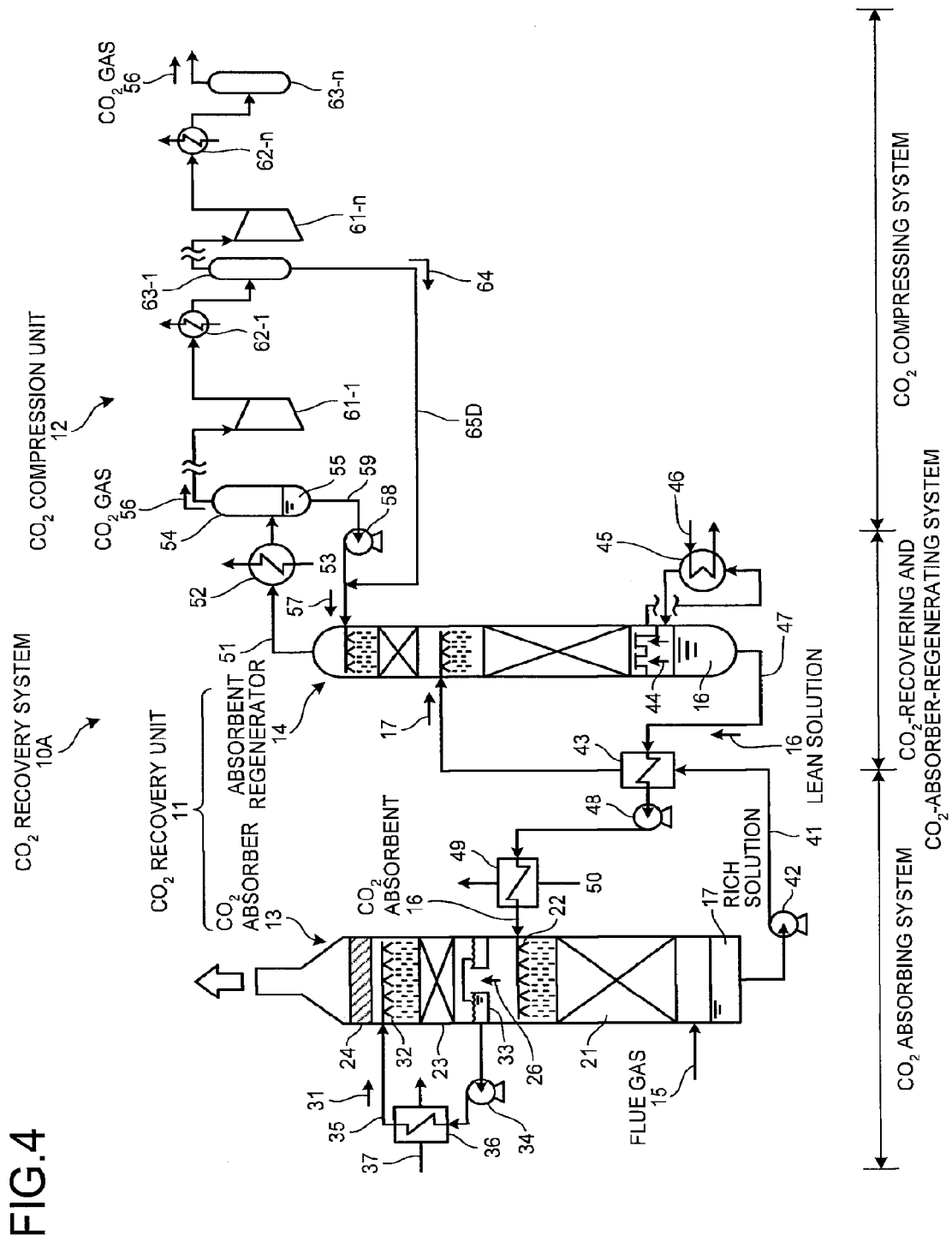
FIG. 4 is a schematic diagram of still another configuration of the $CO_2$ recovery system according to the first embodiment of the present invention.

FIGS. 2 to 4 are schematic diagrams of other configurations of the $CO_2$ recovery system 10A according to the present embodiment.

FIG. 2 is an example in which the condensed water 64 is supplied to the $CO_2$ absorbent 16 that circulates between the $CO_2$ absorber 13 and the regenerator 14. As shown in FIG. 2, the $CO_2$ recovery system 10A according to the present embodiment has a condensed-water supply line 65B that is connected to the lean-solution supply line 47 and the rich-solution supply line 41. In this example, there is no need to heat the condensed water 64 when the condensed water 64 is supplied to the lean solution 16 in the lean-solution supply line 47 and to the rich solution 17 in the rich-solution supply line 41. Accordingly, the condensed-water supply line 65B is connected to the lean-solution supply line 47 and to the rich-solution supply line 41 without installation of the first heat exchanger 66.

The condensed water 64 emitted from the first separator 63-1 is supplied to either the lean solution 16 in the lean-solution supply line 47 or the rich solution 17 in the rich-solution supply line 41, or to both thereof. Amounts of the condensed water 64 to be supplied to the lean solution 16 and the rich solution 17 are adjusted by adjustment valves V11 and V12. In this way, by mixing the condensed water 64 with the lean solution 16 or the rich solution 17, the absorbent contained in the condensed water 64 can be recovered and thus discharge of the absorbent to outside can be suppressed.

FIG. 3 is an example in which the condensed water 64 is supplied to inside of the $CO_2$ absorber 13. As shown in FIG. 3, the $CO_2$ recovery system 10A according to the present embodiment has a condensed-water supply line 65C connected to the top circulating-water line 35. The condensed water 64 emitted from the first separator 63-1 is supplied to the top circulating-water line 35 to be mixed with the water 31 and supplied to the inside of the $CO_2$ absorber 13. In this example, because the condensed water 64 needs not to be heated when it is supplied to the inside of the $CO_2$ absorber 13 through the top circulating-water line 35 as described above, the condensed-water supply line 65C is connected to the top circulating-water line 35 without installation of the first heat exchanger 66. In this way, by mixing the condensed water 64 with the water 31, the absorbent contained in the condensed water 64 can be recovered and therefore discharge of the absorbent to outside can be suppressed.

FIG. 4 is an example in which the condensed water 64 is supplied to the return water 59 to be supplied from the separation drum 54 to the regenerator 14. As shown in FIG. 4, the $CO_2$ recovery system 10A according to the present embodiment has a condensed-water supply line 65D connected to the return-water supply line 59. The condensed water 64 emitted from the first separator 63-1 is supplied to the return-water supply line 59 to be mixed with the return water 57 and supplied to inside of the regenerator 14. In this example, because the condensed water 64 needs not to be heated when it is supplied to the inside of the regenerator 14 through the return-water supply line 59 as described above, the condensed-water supply line 65D is connected to the return-water supply line 59 without installation of the first heat exchanger 66. In this way, by mixing the condensed water 64 with the return water 57, the absorbent contained in the condensed water 64 can be recovered and accordingly discharge of the absorbent to outside can be suppressed.

In the present embodiment, the examples where the condensed water 64 is supplied to any one of the bottom of the absorbent regenerator 14, the $CO_2$ absorbent 16 that circulates between the $CO_2$ absorber 13 and the regenerator 14, the top circulating-water line 35 for supplying the water 31 to the inside of the $CO_2$ absorber 13, and the return water 59 to be sent from the separation drum 54 to the regenerator 14 have been explained as examples in which the condensed water 64 is supplied into the system in which the $CO_2$ absorbent 16 circulates between the $CO_2$ absorber 13 and the regenerator 14. However, the present embodiment is not limited thereto, and the condensed water 64 can be supplied to any two or more thereof through the condensed-water supply lines 65A to 65D.

While the $CO_2$ recovery system 10A according to the present embodiment has the n compressors, the number of compressors to be installed can be appropriately changed according to a compression ratio of the $CO_2$ gas 56.

While the cooling water (C. W) is used as a low-temperature medium that is subjected to heat exchange with the $CO_2$ gas 56 in the first cooler 62-1 to the nth cooler 62-n, the medium is not limited to the cooling water and liquids other than the cooling water in the plant can be used as long as the liquids have lower temperatures than the $CO_2$ gas 56.

As described above, according to the $CO_2$ recovery system 10A of the present embodiment, the moisture generated by compression of the $CO_2$ gas 56 recovered from the regenerator 14 is recovered as the condensed water 64 and supplied into the system in which the $CO_2$ absorbent 16 circulates between the $CO_2$ absorber 13 and the regenerator 14, thereby enabling the absorbent contained in the moisture in the $CO_2$ gas 56 to be recovered without being discharged to outside. Furthermore, the condensed water 64 separated from the first compressor 61-1 is previously heated before it is supplied to the bottom of the regenerator 14 to generate the vapor 64A and then supplied to the bottom of the regenerator 14, thereby enabling the amount of vapor consumed in the reboiler 45 (about 2%, for example) to be reduced. Because the recovery of the moisture contained in the $CO_2$ gas 56 can be handled in the $CO_2$ compressing system, there is no need to newly provide a pipe or the like for sending the recovered condensed water 64, and the condensed water 64 recovered by the first separator 63-1 can be supplied to the regenerator 14 without using a supply pump or the like, so that the recovery of the moisture can be efficiently and easily realized.

Therefore, according to the $CO_2$ recovery system 10A of the present embodiment, the operation efficiency of the entire system can be improved while the absorbent in the condensed water 64 contained in the $CO_2$ gas 56 can be efficiently recovered.

Second Embodiment

A $CO_2$ recovery system according to a second embodiment of the present invention is explained with reference to the drawings. Because the $CO_2$ recovery system according to the present embodiment has the same configuration as that of the $CO_2$ recovery system shown in FIG. 1, like members as those in the $CO_2$ recovery system shown in FIG. 1 are denoted by like reference signs and explanations thereof will be omitted.

Figure 5:
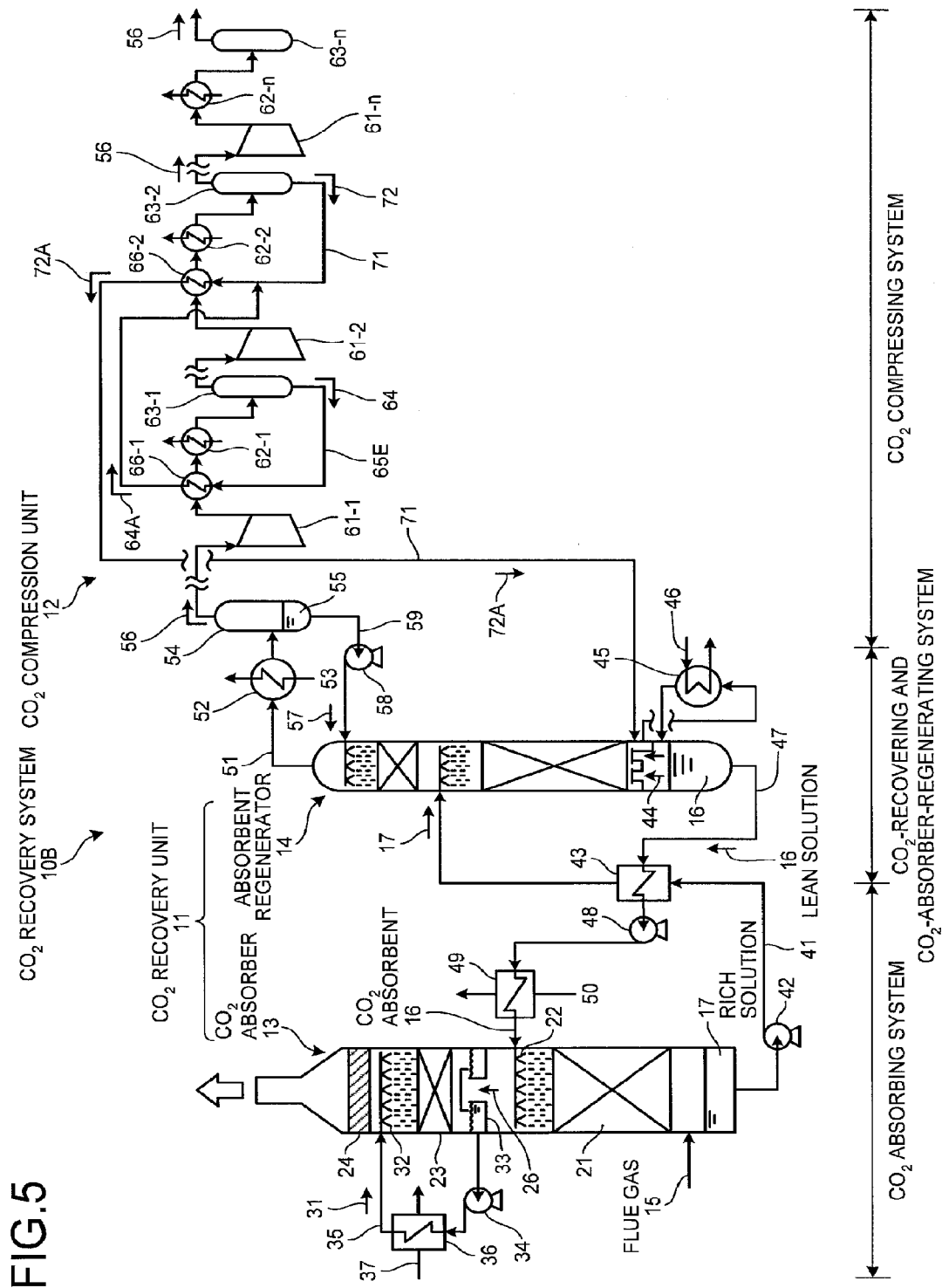
FIG. 5 is a schematic diagram of a configuration of a $CO_2$ recovery system according to a second embodiment of the present invention.

FIG. 5 is a schematic diagram of a configuration of a $CO_2$ recovery system according to the second embodiment of the present invention. As shown in FIG. 5, a $CO_2$ recovery system 10B according to the present embodiment has a second condensed-water supply line 71 that connects the second separator 63-2 located second from the preflow side among the separators and the bottom of the regenerator 14, and a second heat exchanger 66-2 that performs heat exchange between $CO_2$ gas emitted from the second compressor 61-2 located second from the preflow side among the compressors and condensed water 72 separated from the CO₂ gas 56 by the second separator 63-2, in the CO₂ recovery system 10A according to the first embodiment shown in FIG. 1.

The moisture contained in the CO₂ gas 56 that is recovered from the regenerator 14 is recovered by the second separator 63-1 as the condensed water 72 and supplied to the bottom of the absorbent regenerator 14 through the second condensed-water supply line 71. This enables the absorbent accompanying the condensed water 72 and remaining therein to be recovered with the condensed water 72 and thus the absorbent can be recovered without being discharged to outside.

The condensed water 72 emitted from the second separator 63-2 is sent through the second condensed-water supply line 71, subjected to heat exchange with the CO₂ gas 56 emitted from the second compressor 61-2 by the second heat exchanger 66-2 to generate vapor 72A, and then supplied to the regenerator 14. A gas temperature of the CO₂ gas 56 compressed by the second compressor 61-2 is compressed to a higher pressure than in the first compressor 61-1. Accordingly, the condensed water 72 emitted from the second compressor 61-2 can increase a liquid temperature of the condensed water 72 emitted from the second separator 63-2 by the heat exchange in the second heat exchanger 66-2 with the CO₂ gas 56 emitted from the second compressor 61-2 to be higher than a liquid temperature of the condensed water 72 emitted from the first separator 63-1.

Therefore, by previously subjecting the condensed water 71 emitted from the second separator 63-2 to heat exchange with the CO₂ gas 56 emitted from the second compressor 61-2 in the second heat exchanger 66-2 before the condensed water is supplied to the bottom of the regenerator 14 to generate the vapor 72A and then supplying the vapor 72A to the bottom of the regenerator 14 to be mixed with the lean solution 16 heated by the reboiler 45, the amount of vapor consumed by the reboiler 45 can be reduced.

In the present embodiment, a first condensed-water supply line 65E is connected to the second condensed-water supply line 71 on the preflow side of the second heat exchanger in the second condensed-water supply line 71. This enables the condensed water 64 emitted from the first separator 63-1 to be mixed with the condensed water 72 in the second condensed-water supply line 71 and to pass through the second heat exchange 66-2, thereby supplying the condensed water 64 as the vapor 64A to the bottom of the regenerator 14. Accordingly, the amount of vapor consumed by the reboiler 45 can be further reduced.

While the amount of the recovered absorbent is small because the amount of the condensed water 72 emitted from the second separator 63-2 is small, the absorbent in the moisture contained in the CO₂ gas 56 recovered from the regenerator 14 can be recovered more efficiently by mixing also the condensed water 64 emitted from the first separator 63-1 with the condensed water 72. Furthermore, because the second compressor 61-2 compresses the CO₂ gas 56 to the higher pressure than in the first compressor 61-1 as described above, the CO₂ gas 56 emitted from the second compressor 61-2 has a higher gas temperature than that of the CO₂ gas 56 emitted from the first compressor 61-1. Accordingly, the condensed water 72 emitted from the second separator 63-2 can obtain more heat when the heat exchange with the CO₂ gas 56 emitted from the second compressor 61-2 is performed in the second heat exchanger 66-2.

Figure 6:
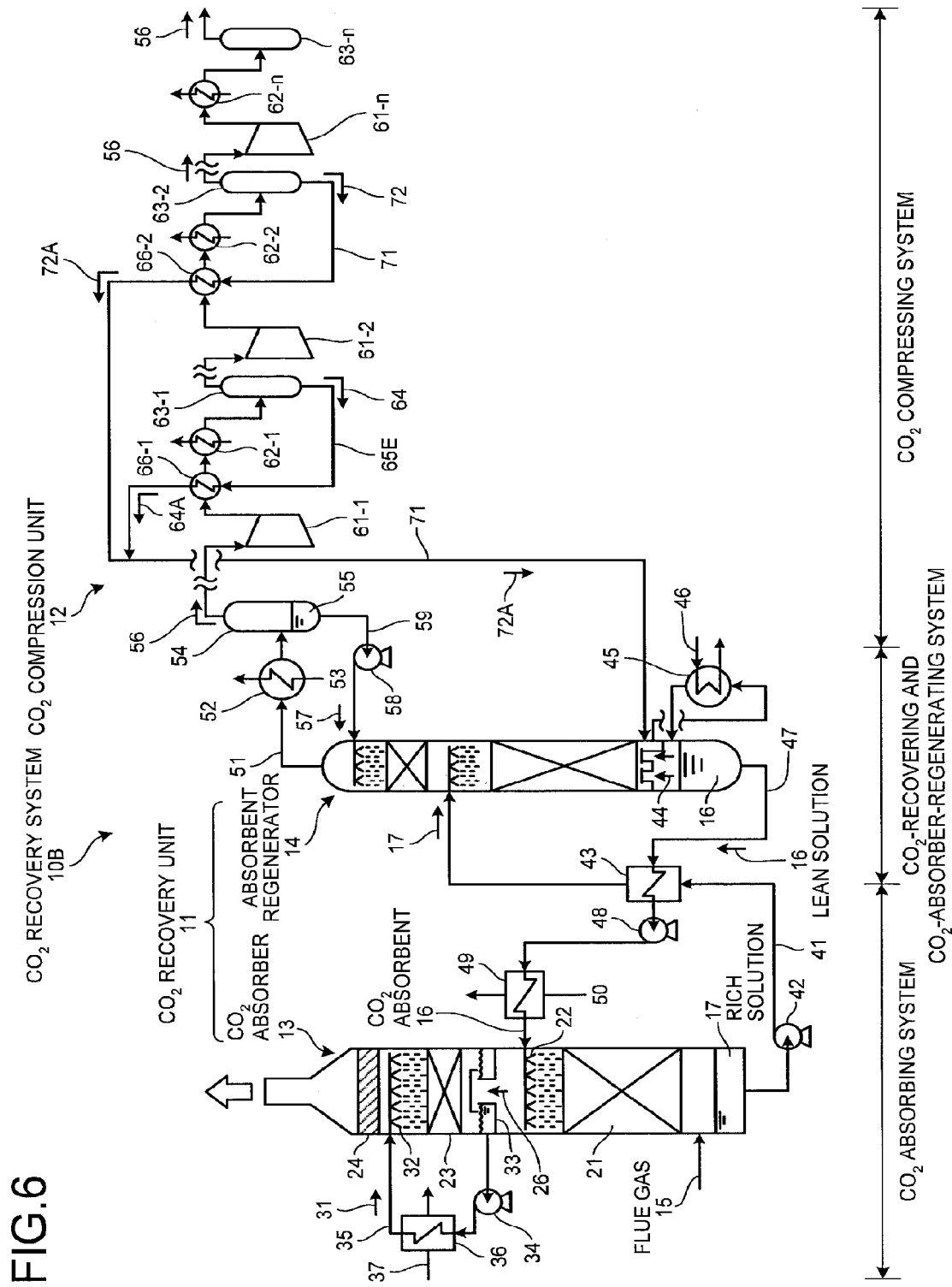
FIG. 6 is a schematic diagram of another configuration of the $CO_2$ recovery system according to the second embodiment of the present invention.

While the first condensed-water supply line 65E is connected to the second condensed-water supply line 71 on the preflow side of the second heat exchanger in the present embodiment, the present embodiment is not limited thereto. FIG. 6 is a schematic diagram of another configuration of the CO₂ recovery system according to the second embodiment of the present invention. As shown in FIG. 6, the first condensed-water supply line 65E can be connected to the second condensed-water supply line 71 on the postflow side of the second heat exchanger in the second condensed-water supply line 71.

Figure 7:
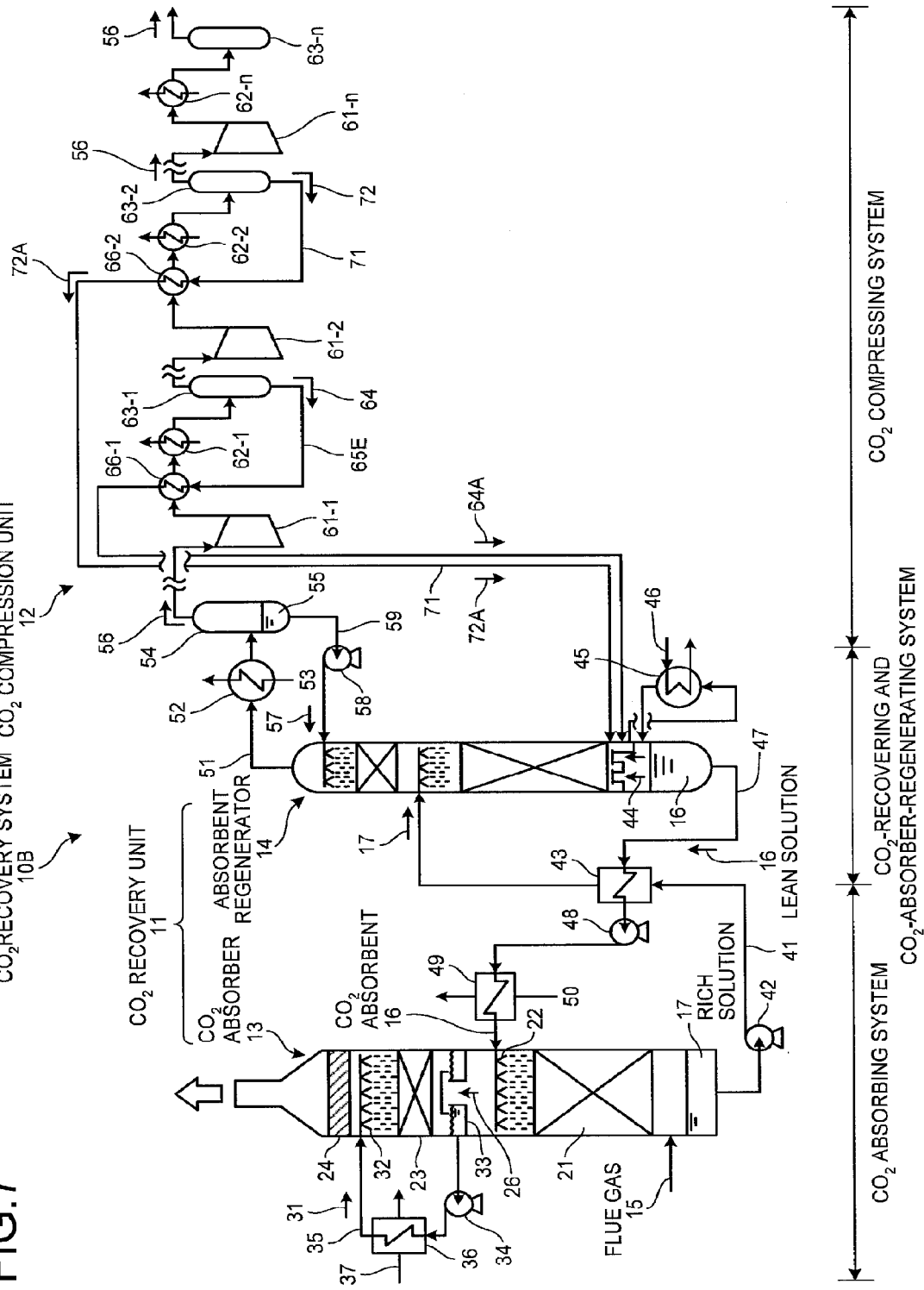
FIG. 7 is a schematic diagram of still another configuration of the $CO_2$ recovery system according to the second embodiment of the present invention.

Furthermore, while the first condensed-water supply line 65E is connected to the second condensed-water supply line 71 in the present embodiment, the present embodiment is not limited thereto. FIG. 7 is a schematic diagram of still another configuration of the CO₂ recovery system according to the second embodiment of the present invention. As shown in FIG. 7, the first condensed-water supply line 65E and the second condensed-water supply line 71 can be separately connected to the bottom of the regenerator 14. This enables a ratio between the vapor 64A generated by heating the condensed water 64 supplied through the first condensed-water supply line 65E and the vapor 72A generated by heating the condensed water 72 supplied through the second condensed-water supply line 71 to be adjusted according to an amount of vapor required by the reboiler 45.

As described above, according to the CO₂ recovery system 10B of the present embodiment, the moisture generated by compressing the CO₂ gas 56 recovered from the regenerator 14 is recovered more as the condensed water 72 and supplied into the system in which the CO₂ absorbent 16 circulates between the CO₂ absorber 13 and the regenerator 14, so that the absorbent contained in the moisture in the CO₂ gas 56 can be recovered more without being discharged to outside. Furthermore, by previously heating the condensed water 72 separated from the second compressor 61-2 to generate the vapor 72A before the condensed water 72 is supplied to the bottom of the regenerator 14 and then supplying the vapor 72A to the bottom of the regenerator 14, an amount of vapor consumed by the reboiler 45 can be reduced more. Because the recovery of the moisture contained in the CO₂ gas 56 can be handled in the CO₂ compressing system, there is no need to newly install a pipe or the like for supplying the recovered condensed water 64, and the condensed water 72 recovered by the second separator 63-2 can be supplied to the regenerator 14 without using a supply pump or the like. Accordingly, the recovery of the moisture can be realized more efficiently and more easily.

Therefore, according to the CO₂ recovery system 10B of the present embodiment, the operation efficiency of the entire system can be improved while the absorbent in the condensed water 64 and 72 contained in the CO₂ gas 56 can be efficiently recovered.

While the CO₂ gas 56 emitted from the first compressor 61-1 and the second compressor 61-2 is used to perform the heat exchange in the first heat exchanger 66-1 and the second heat exchanger 66-2 with the water 65 and 72 that is supplied from the first separator 63-1 and the second separator 63-2 to the regenerator 14 in the first and second embodiments, respectively, the present invention is not limited thereto and the heat exchange with the water 65 or 72 can be performed using the CO₂ gas 56 emitted from another compressor.

REFERENCE SIGNS LIST

10 CO₂ recovery system
11 CO₂ recovery unit
12 compression unit
13 CO₂ absorber
14 absorbent regenerator
15 flue gas
16 CO₂ absorbent (lean solution)
17 rich solution 21 CO₂ absorbing unit
22, 32 spray nozzle
23 water-washing unit
24 demister
26 CO₂-reduced flue gas
31, 55 water
33 receiving unit
34, 42, 48 pump
35 top circulating-water line
36, 49 cooler
37, 50, 53 cooling water
41 rich-solution supply line
43 rich/lean solution heat exchanger
44 steam
45 regenerating superheater (reboiler)
46 saturated steam
47 lean-solution supply line
51, 56 CO₂ gas
52 condenser
54 separation drum
57 return water
58 condensed-water circulating pump
59 return-water supply line
61-1 first compressor
61-$n$ nth compressor
62-1 first cooler
62-$n$ nth cooler
63-1 first separator
63-$n$ nth separator
64, 72 condensed water
64A, 72A vapor
65A to 65E first condensed-water supply line
66-1 first heat exchanger
66-2 second heat exchanger
71 second condensed-water supply line
V11, V12 adjustment valve

The invention claimed is:

1. A $CO_2$ recovery system comprising:
a $CO_2$ recovery unit comprising a $CO_2$ absorber that absorbs and reduces $CO_2$ in flue gas containing $CO_2$ using a $CO_2$ absorbent by bringing the flue gas into contact with the $CO_2$ absorbent, and an absorbent regenerator that regenerates a $CO_2$ absorbent having absorbed $CO_2$ in the $CO_2$ absorber to obtain a $CO_2$ absorbent;
a $CO_2$ compression unit including a set of a compressor and a separator, wherein the compressor compresses $CO_2$ gas emitted from the absorbent regenerator and the separator is located downstream of the compressor to separate moisture contained in the $CO_2$ gas as condensed water from the $CO_2$ gas by cooling compressed $CO_2$ gas emitted from the compressor;
a condensed-water supply line that supplies the condensed water separated from the $CO_2$ gas through the seperator into a system in which the $CO_2$ absorbent circulates between the $CO_2$ absorber and the absorbent regenerator; and
a heat exchanger located on the condensed-water supply line, which subjects the condensed water emitted from the separator to heat exchange with the $CO_2$ gas emitted from the compressor.

2. The $CO_2$ recovery system according to claim 1, wherein the system between the $CO_2$ absorber and the absorbent regenerator is at least one of the following consisting of a bottom of the absorbent regenerator, an inside of the $CO_2$ absorber, $CO_2$ absorbent circulating between the $CO_2$ absorber and the absorbent regenerator, return water to be supplied to the absorbent regenerator from a separation drum that separates water from the $CO_2$ gas emitted from the absorbent regenerator, and a top circulating-water line of the absorber.

* * * * *